Nov. 10, 1925.

R. L. SMOTHERS

HEADLIGHT

Filed March 22, 1924

1,560,948

INVENTOR
R. L. Smothers
BY
ATTORNEY.

Patented Nov. 10, 1925.

1,560,948

UNITED STATES PATENT OFFICE.

RALPH L. SMOTHERS, OF SALINA, COLORADO, ASSIGNOR OF ONE-HALF TO RALPH L. CHRISMAN, OF SALINA, COLORADO.

HEADLIGHT.

Application filed March 22, 1924. Serial No. 701,107.

*To all whom it may concern:*

Be it known that I, RALPH L. SMOTHERS, a citizen of the United States, residing at Salina, in the county of Boulder and State of Colorado, have invented certain new and useful Improvements in Headlights, of which the following is a specification.

This invention relates to improvements in headlights for power driven vehicles and its primary object is to provide in connection with a headlight of conventional construction, a simple and highly efficient device adapted to concentrate the light rays to a comparatively small area directly forward of a vehicle to which the headlight is applied and to thereby eliminate the dangerous and otherwise objectionable glare principally caused by direct and upwardly deflected rays.

Another object of my invention is to provide a light-restricting device of the above described character which intensifies the light directed to the area forward of the vehicle, and still another object is to provide in operative connection with the device, simple means to effect its adjustment from a point within easy reach of the driver of the vehicle.

In the accompanying drawings, the invention has been shown as embodied in an attachment adapted to be applied to headlights of modern type through the medium of a simple clamping member but I desire it understood that with but slight and obvious changes in construction, the co-operating members of the device may be separately mounted on the headlight to form a permanent part thereof.

Figure 1:
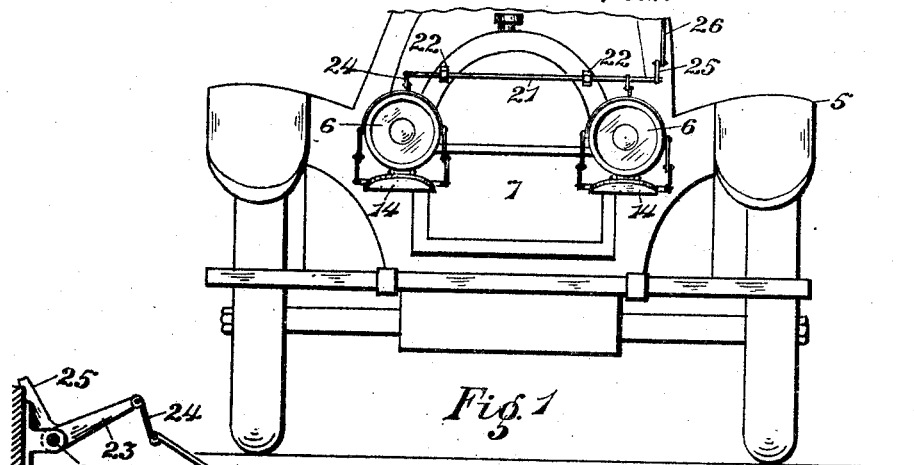
Figure 2:
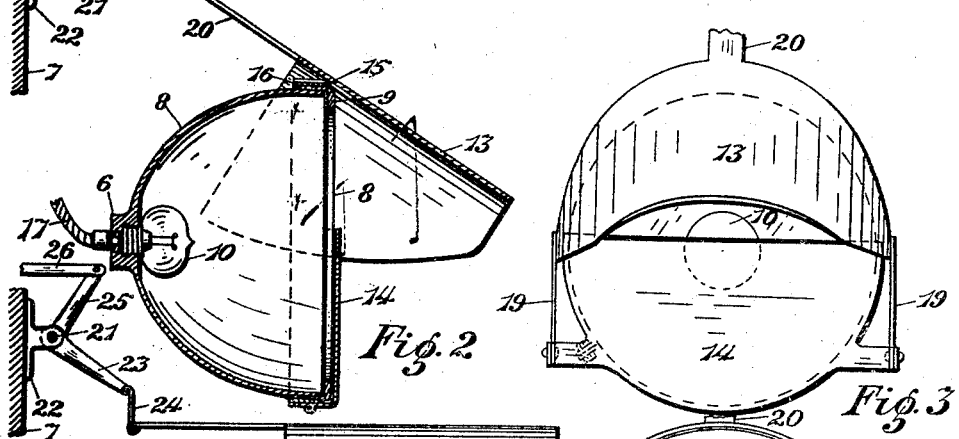
Figure 3:
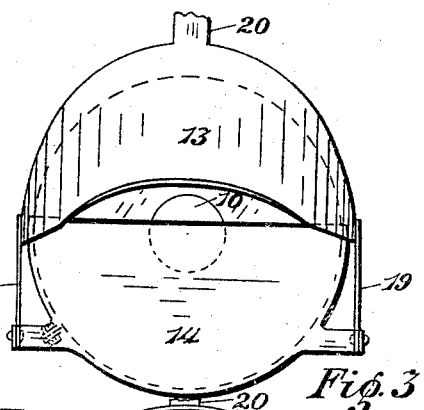
Figure 4:
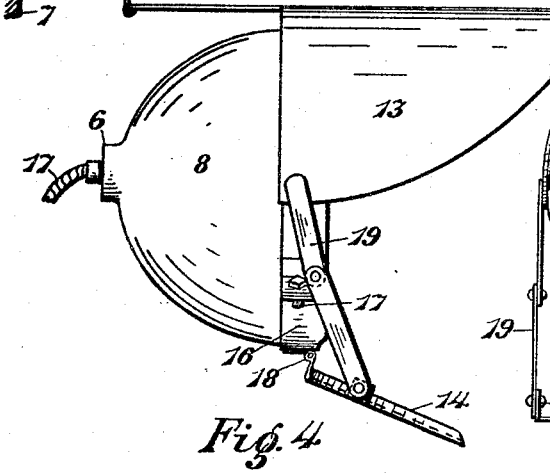
Figure 5:
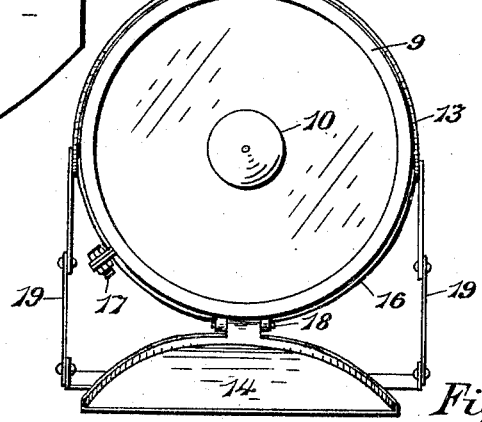

In the drawings in the several views of which like parts are similarly designated, Figure 1 represents a front view of a motor vehicle to which the invention is applied;

Figure 2, a sectional elevation of one of the headlights of the vehicle showing the members of the light-controlling device in their operative position;

Figure 3, a face view of the headlight illustrated in Figure 2;

Figure 4, an elevation of the headlight showing the parts of the light-controlling device in the position to which they are adjusted when it is desired to obtain a wider diffusion of the light; and Figure 5, a face view of the construction shown in Figure 4.

Referring more specifically to the drawings, the numeral 5 designates a motordriven vehicle of conventional construction and 6 the headlights mounted forwardly and at opposite sides of the radiator 7 thereof.

Each headlight consists as usual of a parabolic reflector 8, a glass plate 9 closing the front thereof and held in place by an annular rim 9, and an incandescent lamp 10 which receives its current by means of conductors 12 extending through an opening in the rearward portion of the reflector.

The light-controlling device as applied to each headlight, comprises two members 13 and 14 which are connected for conjunctive movement as will hereinafter be more fully described.

The member 13 consists of a shield or shade curved transversely in conformity with the upper half of the rim of the reflector and hinged as at 15 to a band 16 which encircles the rim and is held in place by means of a bolt 17 extending through apertures of outwardly projecting lugs at its separated ends. The shield projects forwardly of the headlight to which the band is applied and when tilted to the position illustrated in Figures 2 and 3, it directs the light rays downwardly to a restricted area of the road immediately in front of the vehicle.

The member 14 consists of a semi-circular peripherally flanged shutter which is hinged on the band 16 as at 18 and which in its operative position, covers the lower half of the front of the headlight.

The two members are connected for conjunctive movement by means of two articulated elbow joints 19 and the upper member 13 is provided with a rearwardly extending arm 20 for its connection with an operating mechanism by which the controlling devices of both headlights may be simultaneously adjusted from a point adjacent the driver's seat of the vehicle.

The mechanism as shown in the drawings, consists of a shaft 21 rotatably supported in bearings 22 at the front of the radiator 7 and provided with forwardly projecting parallel crank arms 23 which are connected with the arms 20 through the medium of links 24. The shaft has at one of its ends a crank-arm 25 at right angles to the others, and a rod 26 pivotally connected to said arm, extends rearwardly to the dash of the vehicle at which point it may be supported and held by any suitable means.

In the use of the invention, the members of the light controlling devices on the two headlights are normally in the position illustrated in Figures 4 and 5 to permit of the usual diffusion of the light in horizontally directed beams forward of the vehicle.

The shades 13, however, extending over the upper half of the reflectors, obstruct the upward deflection of light rays and thereby concentrate the light rays to where they are of greatest value in illuminating the region forward of the vehicle.

When the vehicle is driven along artificially lighted thoroughfares or when it approaches other vehicles or pedestrians, the driver adjusts the light controlling devices to the position illustrated in Figures 2 and 3, in which the shades 13 are tilted downwardly to direct the light rays to a restricted area immediately in front of the vehicle and positively prevent the upward deflection of the light and in which the shutters 14 cover the lower portions of the glass plates at the front of the headlights and thus aid in preventing the usual glare of the incandescent lamps and their reflectors.

It is an important feature of the invention that the faces of the shield and the shutter opposed to the reflector, are polished or otherwise made light reflective so that when ocupying their light-obstructing position, they intensify by deflection the light thrown forwardly and downwardly from the upper half of the headlights.

I claim:

1. The combination with a headlight, of a shutter adjustable to a position in which it covers the lower portion of the normally unobstructed front of the headlight, a shade adjustable to a position in which it slants downwardly over the upper portion of said front, and mechanism for moving the shutter and the shade in unison to their said adjusted positions.

2. The combination with a headlight of a shutter hinged to be moved upwardly to a position in which it covers the lower portion of the normally unobstructed front of the headlight, a shade hinged to move downwardly to a position in which it slants over the upper portion of said front, and mechanism to effect said movements of the shutter and the shade in unison.

In testimony whereof I have affixed my signature.

RALPH L. SMOTHERS.